US012607317B2

(12) United States Patent
Pfingstl et al.

(10) Patent No.: US 12,607,317 B2
(45) Date of Patent: Apr. 21, 2026

(54) RUNNING LIGHT FOR A VEHICLE

(71) Applicant: Hella GmbH & Co. KGaA, Lippstadt (DE)

(72) Inventors: Rainer Pfingstl, Stegersbach (AT); Niko Thomanek, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/921,232

(22) Filed: Oct. 21, 2024

(65) Prior Publication Data

US 2025/0137603 A1 May 1, 2025

(30) Foreign Application Priority Data

Oct. 25, 2023 (DE) ........................ 102023129450.4

(51) Int. Cl.

| | |
|---|---|
| ***F21S 41/24*** | (2018.01) |
| ***F21S 41/20*** | (2018.01) |
| ***F21S 43/20*** | (2018.01) |
| ***F21S 43/236*** | (2018.01) |
| ***F21S 43/242*** | (2018.01) |
| ***F21W 102/13*** | (2018.01) |
| ***F21W 103/55*** | (2018.01) |

(52) U.S. Cl.
CPC ........... *F21S 41/24* (2018.01); *F21S 41/2805* (2024.05); *F21S 43/236* (2018.01); *F21S 43/246* (2024.05); *F21S 43/265* (2024.05); *F21W 2102/13* (2018.01); *F21W 2103/55* (2018.01)

(58) Field of Classification Search
CPC ....... F21S 43/236; F21S 43/246; F21S 43/265
See application file for complete search history.

(56) References Cited

U.S. PATENT DOCUMENTS

| | | | | |
|---|---|---|---|---|
| 11,396,989 B2 * | 7/2022 | Kang | ...................... | F21S 43/14 |
| 2016/0090138 A1 | 3/2016 | Takenaka | | |

FOREIGN PATENT DOCUMENTS

| | | |
|---|---|---|
| CN | 202511161 U | 10/2012 |
| CN | 105465707 A | 4/2016 |
| CN | 107388159 A | 11/2017 |
| EP | 3258166 A1 | 12/2017 |
| JP | 2015133219 A | 7/2015 |
| WO | 2020174763 A1 | 9/2020 |

OTHER PUBLICATIONS

European Patent Search Report for Application No. 24207981 .2, dated Mar. 21, 2025, 11 Pages.

* cited by examiner

*Primary Examiner* — Matthew J. Peerce
(74) *Attorney, Agent, or Firm* — Husch Blackwell LLP

(57) ABSTRACT

A running light for a vehicle includes at least one light source, a number of first optical waveguides on a first side, a number of second optical waveguides on a second side opposite the first side. One of the first waveguides emits light from the at least one light source in both the main beam direction, which runs along a main axis orthogonal to a secondary axis connecting the first side and second side, as well as in a first area toward the number of second waveguides. The second waveguide emits the light from the at least one light source in both the main beam direction and in a second area toward the number of first waveguides.

14 Claims, 3 Drawing Sheets

RUNNING LIGHT FOR A VEHICLE

CROSS REFERENCE

This application claims priority to German Application No. 10 2023 129450.4, filed Oct. 25, 2023, the entirety which is hereby incorporated by reference.

FIELD OF THE INVENTION

The present invention relates to a running light for a vehicle, a headlamp, and a vehicle with same.

BACKGROUND OF THE INVENTION

Due to traffic regulations, running lights must emit light in a main beam direction, e.g. along a road, as well as to the side, e.g. right and left of the road, or the periphery of the road.

The beam angle of a running light, or running lights, should illuminate at an angle 80° to the main beam direction, such that the running light can be readily seen from a position to the side of the vehicle.

Existing running lights, or side marker lights, are optimized for one side of a vehicle, and emit light in a main beam direction and to a single side. Consequently, two running lights normally work together to emit light at both sides.

Furthermore, there is limited installation space on motorcycles.

BRIEF SUMMARY OF THE INVENTION

The object of the present invention is to create a compact and reliable running light for a vehicle.

A running light for a vehicle is therefore proposed in a first aspect of the invention.

This running light contains at least one light source, a number of first optical waveguides on a first side, and a number of second optical waveguides on a second, opposite side, in which one of the first waveguides is configured to emit light from the at least one light source in both the main beam direction, which runs along a main axis that is orthogonal to a secondary axis connecting the first and second side, as well as in an area toward the number of second waveguides, and a second waveguide is configured to emit light from the at least one light source in both the main beam direction and in a second area toward the number of first waveguides.

This running light, which can be a side marker light, for example, contains numerous optical waveguides, at least some of which are opposite one another.

The individual optical waveguides in the proposed running light emit light in a main beam direction, e.g. toward the front, or along a road, and to one side, in a lateral beam direction, or lateral beam area. Some of the waveguides emit light laterally toward an opposite waveguide, such that the proposed running light emits light in the main beam direction and toward both sides, such that it can be seen from the front and both sides.

The lateral light beams from the first and second waveguides can cross. In this case, the first and second waveguides are designed and placed in relation to one another such that the light beams emitted from the first and second waveguides cross through the middle of the running light.

To ensure that the running light can be easily seen from the side, the waveguides therein illuminate the area on both sides of the main beam direction. This means that the running light, or the light beams thereof, can be seen from anywhere to the side thereof.

To ensure that the proposed running light can be seen from both sides while occupying a limited installation space, the optical waveguides are placed and configured such that lateral light beams from the waveguides cross, in particular two dimensionally. These waveguides thus emit light to the side, toward the inside, e.g. toward the middle of the running light. These waveguides can be angled toward one another in particular, such that they emit light beams angled laterally, which thus cross through one another.

Alternatively, the waveguides in the running light can be configured to emit the lateral light beams parallel to one another, in opposite directions.

Consequently, instead of being able to see the waveguide on the respective side of the running light, the wave guide on the other side can be seen. This means that a cover on the running light, or the respective waveguides in the running light, slopes laterally downward and can therefore be more aerodynamic.

Furthermore, the running light, or the waveguides, can be placed such that they rise toward the middle, resulting in an illuminating surface that can be readily seen from the side. This running light can therefore be shaped such that its highest point is at the center, and its lowest point is at both ends.

The waveguides can also be angled such that the light beams they emit pass over or under the opposite waveguides.

Furthermore, the distance between the first and second waveguides can be less than or equal to 75 mm.

With a spacing of less than or equal to 75 mm between numerous luminous elements, or waveguides, they form an assembly having the appearance of a single running light.

The first and second areas between the main beam direction and their respective outer boundaries each span an angle of at least 80° to the main beam direction.

Areas spanning an angle of 80° satisfy legal requirements for running lights, thus resulting in a proposed running light suitable for use in traffic.

Each optical waveguide can have a dedicated light source.

A particularly bright and potentially independent lighting of the waveguides can be obtained using numerous light sources for numerous waveguides. More complex patterns can also be obtained with numerous light sources, e.g. with which only one side is lit, or can be seen as lit.

This running light can emit light in the main beam direction and over at least 80° to both sides when it is in use.

By lighting both sides over at least 80°, an arc of at least 160° is lit by the running light, resulting in it being visible over a broad area.

A first optical waveguide can have a structured surface that conducts light to a first area, while a second waveguide can have a structured surface that conducts light to a second area.

To conduct light laterally into a first area, the structured surface can comprise numerous strips or cuboids, which diffract the beams and conduct or concentrate them into the first area. There can be numerous strips, for example, interspersed with flat sections.

The running light can also have just one first and one second waveguide, the first of which comprises a first primary area and a first secondary area, while the second comprises a second primary area and second secondary area, the first primary area of which is configured to emit light from the at least one light source in both the main beam direction and in the first area toward the second waveguide, while the second waveguide is configured to emit light in both the main beam direction and in the second area toward the first waveguide, while the first and second secondary waveguides are configured to emit light from the at least one light source only along the main beam direction.

A complex light geometry with numerous lighting areas with different beam characteristics can be obtained with only a few waveguides, which have individual areas configured to emit light that can be seen from the side.

A second aspect of the invention relates to a headlamp that comprises both a high beam and low beam, in addition to the running light.

A headlamp containing the running light obtained with the invention can be particularly compact while still satisfying all of the legal requirements for lights used in traffic.

This headlamp can be designed for use with motorcycles.

The compact running light results in a headlamp that is ideal for motorcycles. This headlamp can be particularly aerodynamic, due to the running light obtained with the invention, i.e. particular compact and/or streamlined, thus optimizing driving stability for the motorcycle.

A third aspect of the invention relates to a vehicle that has one of the possible designs for the proposed running light. This vehicle can be a motorcycle in particular.

Advantages described in reference to the first aspect of the invention relating to a running light for a vehicle also apply equally to the headlamp obtained with the second aspect of the invention, and to the vehicle obtained with the third aspect of the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
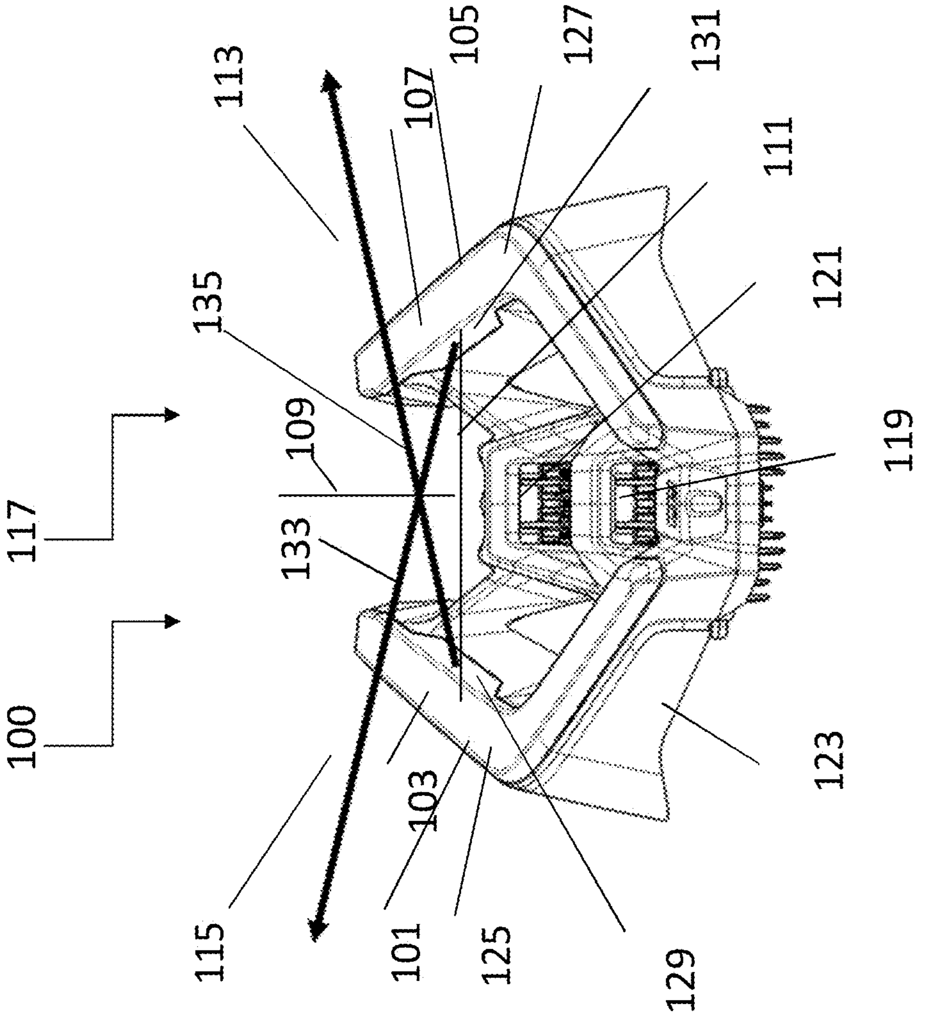
FIG. 1 shows one possible design for the proposed headlamp, with one possible design for the proposed running light.

The running light 100 contains a light source (not shown), a first optical waveguide 103 on the first side 101, and a second optical waveguide 107 on the second side 105, opposite the first side 103.

The first waveguide 103 is configured to emit light from the first light source in both a main beam direction that runs along a main axis 109 orthogonal to a secondary axis 111 connecting the first side 101 and second side 105, and in a first area 113 toward the second waveguide 107.

The light source can emit light parallel to the main axis 109 and in an area over an angle of 5° to 25° to the main axis 109.

The second waveguide 107 is configured to emit light from the first light source in both the main beam direction and in a second area 115 toward the first waveguide 103.

The running light 100 is shown as part of a headlamp 117 in FIG. 1, which also contains a low beam 119 and a high beam 121, which is connected to the running light 100 by a frame 123.

The first waveguide 103 is enclosed in a first cover 125 made of transparent plastic. The second waveguide 107 is enclosed in a second cover 127 made of transparent plastic.

The first cover 125 has a first translucent side window 129 and the second cover 127 has a second translucent side window 131.

Because of the L-shaped form of the first waveguide 103 and second waveguide 107, the legs of which are angled slightly toward one another, and a slight upward angle of the first waveguide 103 and second waveguide 107, the light beams emitted from the first waveguide 103 and second waveguide 107 cross, as indicated by the arrows 133 and 135.

The first waveguide 103, on the left side, can therefore be seen from the right of the running light 100, and the second waveguide 107, on the right side, can be seen from the left of the running light 100.

Figure 2:
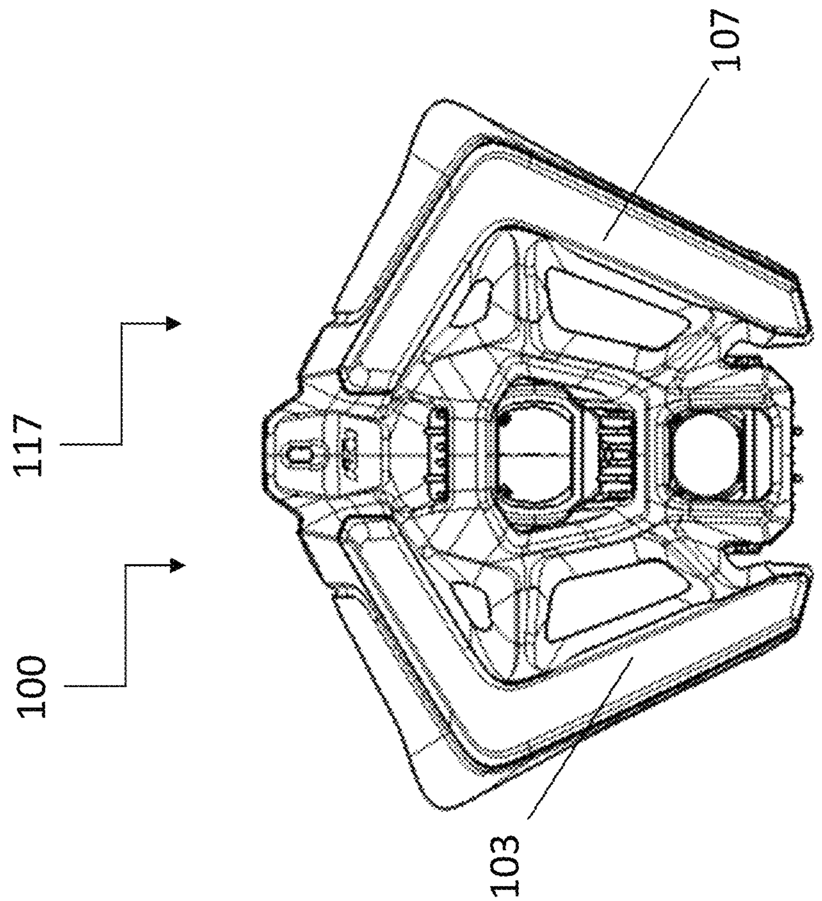
FIG. 2 shows another view of the proposed headlamp.

The headlamp 117 is shown from above in FIG. 2. The first waveguide 103 and second waveguide 107 can be easily identified therein.

Figure 3:
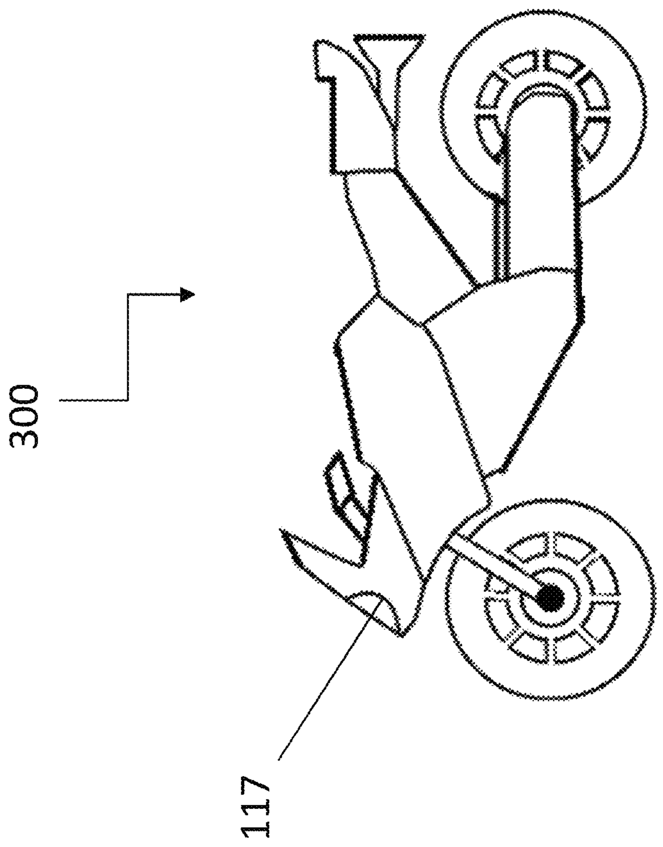
FIG. 3 shows one possible design for the proposed vehicle.

FIG. 3 shows a vehicle 300 in the form of a motorcycle. The vehicle 300 has a headlamp 117 that contains the running light 100 shown in FIG. 1.

LIST OF REFERENCE SYMBOLS

100 running light
101 first side
103 first optical waveguide
105 second side
107 second optical waveguide
109 main axis
111 secondary axis
113 first area
115 second area
117 headlamp
119 low beam
121 high beam
123 frame
125 first cover
127 second cover
129 first side window
131 second side window
133 arrow
135 arrow
300 vehicle

The invention claimed is:

1. A running light for a vehicle, the running light comprising:

at least one light source;

a first optical waveguide on a first side, the first optical waveguide having a first primary lighting region and a first secondary lighting region; and a second optical waveguide on a second side, opposite the first side, the second optical waveguide having a second primary lighting region and a second secondary lighting region;

wherein the first primary lighting region of the first optical waveguide emits light from the at least one light source in both a main beam direction, which runs along a main axis orthogonal to a secondary axis connecting the first side and the second side, and in a first area toward the second optical waveguide, wherein the second primary lighting region of the second optical waveguide emits light from the at least one light source in both the main beam direction and in a second area toward the first optical waveguide, and wherein the first secondary lighting region of the first optical waveguide and the second secondary lighting region of the second optical waveguide emit light from the at least one light source only along the main beam direction.

2. The running light according to claim 1, wherein light beams emitted laterally from the first optical waveguide and the second optical waveguide cross one another.

3. The running light according to claim 1, wherein a distance between the first optical waveguide and the second optical waveguide is less than or equal to 75 mm.

4. The running light according to claim 1, wherein the first area and the second area span an angle of at least 80° between the main beam direction and an outer boundary line.

5. The running light according to claim 1, wherein the running light emits light in the main beam direction and in two opposite sides, over at least 80° on each side, which face outward from the main beam direction of the running light.

6. The running light according to claim 1, wherein the first optical waveguide has a structured surface that conducts light into the first area and the second optical waveguide has a structured surface that conducts light into the second area.

7. The running light according to claim 1, wherein the running light has a single first optical waveguide and a single second optical waveguide.

8. A headlamp for a vehicle, wherein the headlamp comprises a running light according to claim 1, wherein the headlamp further includes a low beam and a high beam.

9. The headlamp according to claim 8, wherein the headlamp is a motorcycle headlamp.

10. A vehicle comprising a running light according to claim 1.

11. The vehicle according to claim 10, wherein the vehicle is a motorcycle.

12. The running light according to claim 1, wherein the first optical waveguide and the second optical waveguide are each L-shaped.

13. The running light according to claim 12, wherein legs of the first optical waveguide are angled toward legs of the second optical waveguide, and wherein the first optical waveguide and the second optical waveguide each extend at an upward angle.

14. The running light according to claim 1, wherein the first optical waveguide is enclosed in a first transparent cover and the second optical waveguide is enclosed in a second transparent cover.

* * * * *